(12) United States Patent
Broz et al.

(10) Patent No.: US 9,509,758 B2
(45) Date of Patent: Nov. 29, 2016

(54) RELEVANT COMMENTARY FOR MEDIA CONTENT

(71) Applicant: LENOVO ENTERPRISE SOLUTIONS (SINGAPORE) PTE. LTD., Singapore (SG)

(72) Inventors: Michal Broz, Austin, TX (US); Bernadette A. Carter, Durham, NC (US); Melba I. Lopez, Austin, TX (US); Matthew G. Marum, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 249 days.

(21) Appl. No.: 13/896,489

(22) Filed: May 17, 2013

(65) Prior Publication Data

US 2014/0344353 A1  Nov. 20, 2014

(51) Int. Cl.
*H04L 29/08* (2006.01)
*G06F 15/173* (2006.01)
*G06Q 50/00* (2012.01)
*H04L 12/58* (2006.01)

(52) U.S. Cl.
CPC ......... *H04L 67/10* (2013.01); *G06F 15/17306* (2013.01); *G06Q 50/01* (2013.01); *H04L 51/32* (2013.01)

(58) Field of Classification Search
CPC ...................................................... H04L 67/10
USPC ...................................................... 709/204
See application file for complete search history.

(56) References Cited

U.S. PATENT DOCUMENTS

| | | | |
|---|---|---|---|
| 6,854,087 B1 | 2/2005 | Takeo et al. | |
| 7,870,480 B1 * | 1/2011 | Oswald | G06F 17/241 715/230 |
| 7,934,983 B1 * | 5/2011 | Eisner | 463/6 |
| 8,074,184 B2 | 12/2011 | Garside et al. | |
| 9,256,343 B1 * | 2/2016 | Stekkelpak | G06F 3/0481 |
| 2002/0130868 A1 * | 9/2002 | Smith | G06Q 40/04 345/440 |
| 2003/0101151 A1 * | 5/2003 | Holland | G06N 3/004 706/45 |
| 2003/0135481 A1 * | 7/2003 | Helmes | G06Q 10/10 |
| 2004/0019688 A1 * | 1/2004 | Nickerson | G06Q 30/02 709/229 |
| 2006/0015811 A1 | 1/2006 | Tanaka et al. | |

(Continued)

OTHER PUBLICATIONS

Merriam-Webster, "ambiguous", 2015.*

(Continued)

*Primary Examiner* — O. C. Vostal
(74) *Attorney, Agent, or Firm* — Brandon C. Kennedy; Katherine S. Brown; Kennedy Lenart Spraggins LLP

(57) ABSTRACT

Methods, products, apparatuses, and systems may provide and/or receive relevant commentary for media content. Additionally, the relevant commentary may be provided and/or received in response to rendering a section of the media content. In addition, the relevant commentary may be provided and/or received based on one or more of a preference for a temporal perspective, a preference for a viewpoint, and/or a preference for a state of a social network. Moreover, the relevant commentary may be provided and/or received based on a topic related to the section of the media content. The relevant commentary may be provided and/or received based on an authorship independent of a media content access event by an author of the relevant commentary. In addition, an ambiguous section of the media content may be clarified, and/or an interactive commentary session may be simulated.

19 Claims, 3 Drawing Sheets

(56) References Cited

U.S. PATENT DOCUMENTS

| | | | |
|---|---|---|---|
| 2006/0061595 A1 | 3/2006 | Goede et al. | |
| 2006/0218495 A1 | 9/2006 | Onda et al. | |
| 2006/0277523 A1 | 12/2006 | Horen et al. | |
| 2007/0250810 A1 | 10/2007 | Tittizer et al. | |
| 2008/0086307 A1 | 4/2008 | Okayama et al. | |
| 2008/0109875 A1 | 5/2008 | Kraft | |
| 2008/0286727 A1* | 11/2008 | Nemeth | G09B 7/04 434/30 |
| 2008/0317439 A1 | 12/2008 | Wong et al. | |
| 2009/0063991 A1* | 3/2009 | Baron et al. | 715/751 |
| 2009/0222361 A1* | 9/2009 | Smith | G06Q 40/12 705/30 |
| 2010/0095326 A1* | 4/2010 | Robertson, III | 725/40 |
| 2010/0121912 A1 | 5/2010 | Kawakami et al. | |
| 2010/0136509 A1* | 6/2010 | Mejer | G06F 19/363 434/219 |
| 2010/0250445 A1* | 9/2010 | Solheim | G06Q 10/06 705/80 |
| 2010/0318520 A1 | 12/2010 | Loeb et al. | |
| 2011/0010367 A1* | 1/2011 | Jockish et al. | 707/733 |
| 2011/0055335 A1* | 3/2011 | Reilly | G06Q 10/107 709/206 |
| 2011/0138354 A1* | 6/2011 | Hertenstein | G06F 8/38 717/115 |
| 2011/0154200 A1 | 6/2011 | Davis et al. | |
| 2011/0202544 A1* | 8/2011 | Carle | H04W 4/02 707/754 |
| 2012/0143590 A1 | 6/2012 | Ajima | |
| 2012/0150997 A1 | 6/2012 | Mcclements, IV | |
| 2012/0274750 A1* | 11/2012 | Strong | 348/52 |
| 2012/0316962 A1 | 12/2012 | Rathod | |
| 2013/0004138 A1* | 1/2013 | Kilar | H04N 21/4756 386/230 |
| 2013/0080407 A1* | 3/2013 | Levow | G06F 17/30348 707/692 |
| 2013/0086077 A1* | 4/2013 | Piippo et al. | 707/748 |
| 2013/0159127 A1 | 6/2013 | Myslinski | |
| 2013/0170561 A1* | 7/2013 | Hannuksela | 375/240.25 |
| 2013/0212059 A1* | 8/2013 | Ameri-Yahia | G06F 17/30713 706/52 |
| 2013/0227016 A1 | 8/2013 | Risher et al. | |
| 2013/0254308 A1* | 9/2013 | Rose et al. | 709/206 |
| 2013/0325954 A1 | 12/2013 | Cupala | |
| 2014/0032481 A1 | 1/2014 | Lang | |
| 2014/0032633 A1* | 1/2014 | Kleppner | G06F 17/241 709/202 |
| 2014/0033015 A1 | 1/2014 | Shaver | |
| 2014/0082096 A1 | 3/2014 | Scherpa et al. | |
| 2014/0181630 A1 | 6/2014 | Monney et al. | |
| 2014/0280377 A1* | 9/2014 | Frew | G06F 17/30312 707/805 |
| 2015/0229698 A1* | 8/2015 | Swan | H04L 67/42 709/203 |

OTHER PUBLICATIONS

Sun-Bum, Youn, "Social Media-Based Three-Screen TV Service," Consumer Electronics (ICCE) 2011 IEEE International Conference on, Jan. 9-12, 2011, Abstract, Las Vegas, <http://ieeexplore.ieee.org/xpls/abs_all.jsp?arnumber=5722923&tag=1>.

* cited by examiner

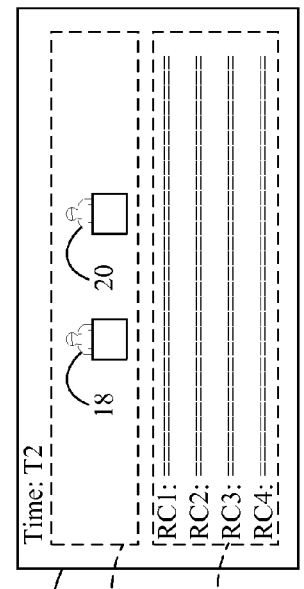
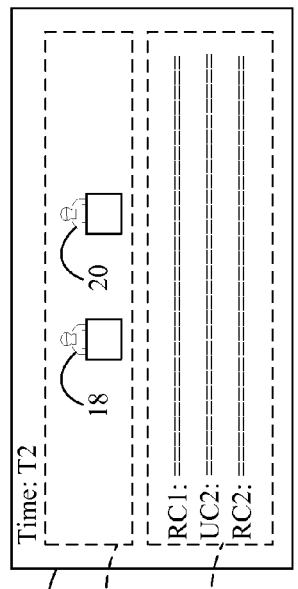
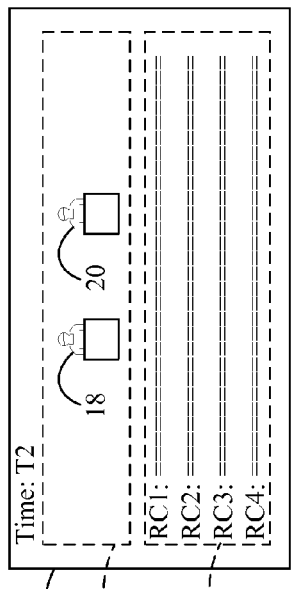
FIG. 1A  FIG. 1B  FIG. 1C
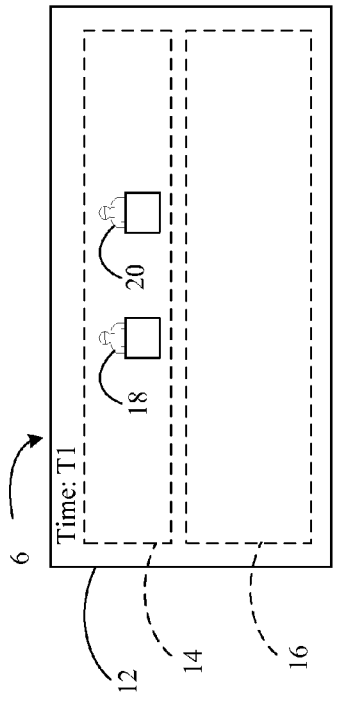
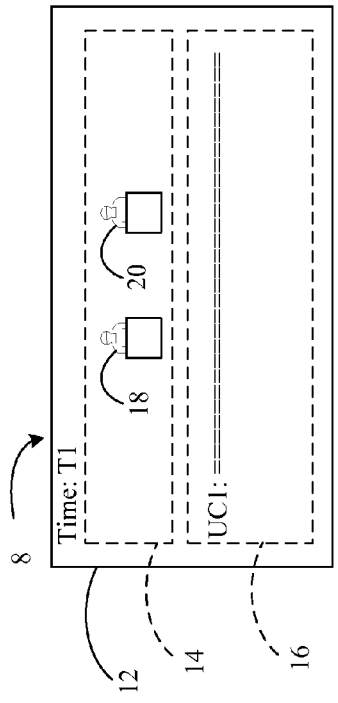
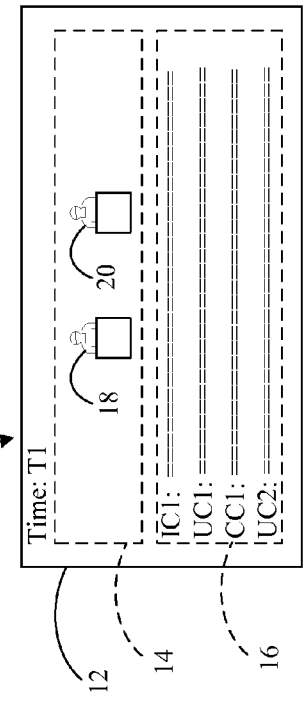

RELEVANT COMMENTARY FOR MEDIA CONTENT

BACKGROUND

Embodiments of the present invention generally relate to relevant commentary for media content. More particularly, embodiments relate to providing (and/or receiving) relevant commentary for media content based on a preference, such as a preference for one or more of a temporal perspective, a viewpoint, and/or a state of a social network.

Commentary for media content may be provided to users of the media content. For example, the commentary may include a list of posts associated with a video or a log of a conversation that has taken place between two or more users. Social media buzz may also be presented alongside television media content. The commentary, however, may fail to adequately take into consideration a number of factors such as temporal perspective and viewpoint.

BRIEF SUMMARY

Embodiments may include a method involving providing relevant commentary to a user. The method may include providing relevant commentary to the user in response to rendering a section of media content. In addition, at least a portion of the relevant commentary may be based on a preference, such as a preference for a temporal perspective.

Embodiments may include a method involving receiving relevant commentary. The method may include receiving relevant commentary in response to rendering a section of media content. In addition, at least a portion of the relevant commentary may be based on a preference, such as a preference for a temporal perspective.

Embodiments may include a method involving detecting a media content access event by a user. The method may include providing relevant commentary to the user in response to rendering a section of media content. In addition, at least a portion of the relevant commentary may be based on a preference, such as two or more of a preference for a temporal perspective, a preference for a viewpoint, and a preference for a state of a social network.

Embodiments may include a method involving providing (and/or receiving) at least a portion of the relevant commentary based on a topic related to the section of the media content. The method may include providing (and/or receiving) at least a portion of the relevant commentary based on an authorship independent of a media content access event by an author of the relevant commentary. In addition, the method may include clarifying an ambiguous section of the media content. Moreover, the method may include simulating an interactive commentary session.

Embodiments may include a computer program product having a computer readable storage medium and computer usable code stored on the computer readable storage medium. If executed by a processor, the computer usable code may cause a computer to provide relevant commentary to a user. The computer usable code, if executed, may also cause a computer to provide relevant commentary to the user in response to a render of a section of media content. The computer usable code, if executed, may also cause a computer to cause at least a portion of the relevant commentary to be based on a preference, such as a preference for a temporal perspective.

Embodiments may include a computer program product having a computer readable storage medium and computer usable code stored on the computer readable storage medium. If executed by a processor, the computer usable code may cause a computer to receive relevant commentary. The computer usable code, if executed, may also cause a computer to receive relevant commentary in response to a render of a section of media content. The computer usable code, if executed, may also cause a computer to cause at least a portion of the relevant commentary to be based on a preference, such as a preference for a temporal perspective.

Embodiments may include a computer program product having a computer readable storage medium and computer usable code stored on the computer readable storage medium. If executed by a processor, the computer usable code may cause a computer to detect a media content access event by a user. The computer usable code, if executed, may also cause a computer to provide relevant commentary to the user in response to a render of a section of the media content. The computer usable code, if executed, may also cause a computer to cause at least a portion of the relevant commentary to be based on a preference, such as two or more of a preference for a temporal perspective, a preference for a viewpoint, and a preference for a state of a social network.

Embodiments may include a computer program product having a computer readable storage medium and computer usable code stored on the computer readable storage medium. If executed by a processor, the computer usable code may cause a computer to cause at least a portion of the relevant commentary to be based on a topic to be related to the section of the media content. If executed, computer usable code may cause at least a portion of the relevant commentary to be based on an authorship independent of a media content access event by an author of the relevant commentary. The computer usable code, if executed, may cause a computer to clarify an ambiguous section of the media content. The computer usable code, if executed, may cause a computer to simulate an interactive commentary session.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIGS. 1A to 1C are block diagrams of examples of schemes of providing (and/or receiving) relevant commentary in response to rendering a section of media content according to an embodiment;

DETAILED DESCRIPTION

Figure 2:
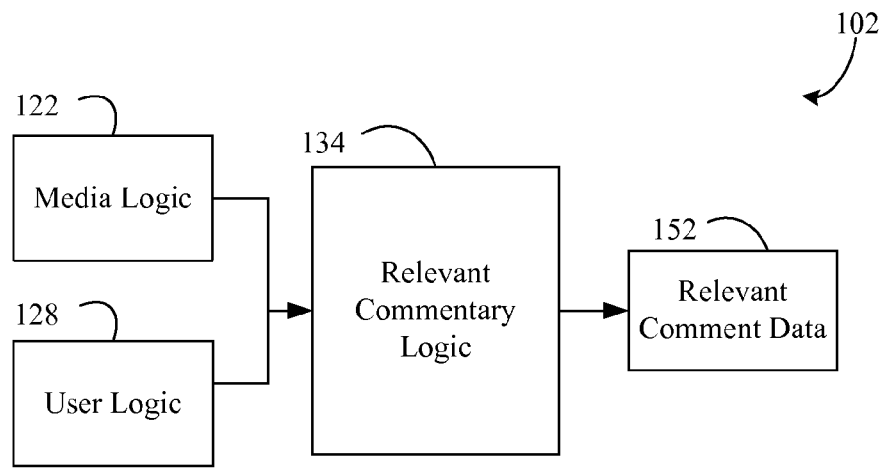
FIG. 2 is a block diagram of an example of an architecture including logic to provide (and/or receive) relevant commentary in response to a render of a section of media content according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

When faced with a media access event (e.g., a video access request), it may be valuable to augment a user experience by providing commentary (e.g., feeds of posts, news articles, blog posts, etc.), such as commentary generated when the media content was originally broadcasted (e.g., posted, published, etc.). It may also be valuable to augment the user experience by filtering the commentary according to a preference, such as a preference for a temporal perspective, a viewpoint, and/or a state of a social network. Additionally, the user experience may be augmented by providing past commentary (e.g., commentary made at a time of a past original broadcast, commentary made at a time before the past original broadcast, etc.) and/or present commentary (e.g., commentary made at a time of a present original broadcast, at a time that a user watches a broadcast replay in the present, etc.), which may be related to a topic (e.g., a topic addressed in the media content). Augmenting the user experience may also involve providing an opportunity to enter commentary (e.g., post), which may be shared with a social network and/or used to tailor the user experience. In addition, ambiguous media content may be clarified and/or made the subject of a simulated interactive commentary session.

Referring now to FIGS. 1A to 1C, schemes 6, 8 and 10 are shown of providing (and/or receiving) relevant commentary in response to rendering a section of media content according to an embodiment. The commentary and/or the media content may include any information that may be generated, processed, stored, retrieved, rendered, and/or exchanged in electronic form. Examples of the commentary and/or the media content may include audio, video, images, text, hypertext links, graphics, and so on, or combinations thereof. In one example, the commentary may include a post, a ranking, an instant message, a chat, an email, polling data, and so on, or combinations thereof. In another example, the media content may include a video, a song, a television program, a picture, and so on, or combinations thereof.

The commentary and/or the media content may refer to a section thereof. For example, the section of the commentary may include one or more comments from among a string of comments by the same or different individual. The section of the commentary and/or of the media content may include a frame of a video, an area of an image, a segment of audio, a domain of a hypertext link, a chapter of a book, a paragraph of an article, and so on, or combinations thereof. The commentary and/or the media content may include a live (e.g., real-time) communication, a recorded communication, and so on, or combinations thereof. Accordingly, a media content access event may include generating, processing, storing, retrieving, rendering, and/or exchanging information in electronic form.

In the illustrated example of FIG. 1A, the scheme 6 may include a computing device 12 having a media render portion 14 to display media content (e.g., video). Accordingly, a media content access event (e.g., a video access event) may involve launching a media player application, launching a web browser, retrieving the media content from storage, receiving the media content from an image capture device (e.g., on or off-device camera), rendering (e.g., displaying) the media content, and so on, or combinations thereof. The media content access event may be detected by the computing device 10 itself, by a remote computing device (e.g., off-platform remote server, off site remote server, etc., not shown), and so on, or combinations thereof. The media content displayed in the media render portion 14 may include a beginning section (e.g., first minutes of a video, introduction section, first chapter of a book, etc.), an intermediate section (e.g., any time between the beginning and end of the media content), a final section (e.g., final minutes of the video, final paragraph of an article, etc.), and so on, or combinations thereof. The media content displayed in the media render portion 14 may also include a plurality of stacked media content (e.g., videos, text, images, etc.), which may be completely overlaid, staggered, side-by-side, and so on, or combinations thereof. At time T1, a video may be displayed in the media render portion 14 of a debate between candidates 18, 20, which may include a live communication (e.g., present original broadcast), a recorded communication (e.g., past original broadcast), and so on, or combinations thereof.

The computing device 12 may also include a commentary render portion 16 to display commentary. The commentary may be separate from the media content, the commentary may be overlaid with the media content using varying degrees of transparency among the media render portion 14 and the commentary render portion 16, the commentary render portion 16 may be provided as a region of the media render portion 14 and vice versa, and so on, or combinations thereof. At the time T1, the commentary render portion 16 may be vacant, may be completely transparent, and so on, or combinations thereof. At time T2, a section of the media content (e.g., intermediate section of the debate) may be encountered to cause the commentary render portion 16 to populate. In one example, the commentary render portion 16 may populate by manually and/or automatically becoming less transparent, by adding commentary, and so on, or combinations thereof. The commentary displayed in the commentary render portion 16 may include a plurality of stacked commentary (e.g., videos, text, images, etc.), which may be completely overlaid, staggered, side-by-side, and so on, or combinations thereof. At the time T2, the commentary render portion 16 may display side-by-side textual relevant commentary RC1, RC2, RC3, RC4, although it is understood that any number and type of relevant commentary may be displayed (e.g., by scrolling up or down through the render portion 16, by enlarging the render portion 16, etc.).

The relevant commentary RC1, RC2, RC3, RC4 may be provided based on a preference for a temporal perspective. In one example, the user may wish to view relevant commentary from a past time period based on the preference for a past perspective. The user may view a recorded video of a debate that occurred in a past time period, a time period may be determined (e.g., a past time period), and a portion of the relevant commentary (e.g., RC1, etc.) may be provided by, and/or received at, the commentary render portion 16 from a past time period (e.g., the time period corresponding approximately to the past original broadcast, the time period corresponding approximately to before the past original broadcast, etc.). In another example, the user may wish to view relevant commentary from a present time period based on the preference for a present temporal perspective. The user may therefore view the recorded video of the debate that occurred in the past time period, a time period may be determined (e.g., a present time period), and a portion of the relevant commentary (e.g., RC1, etc.) may be provided by, and/or received at, the commentary render portion 16 from a present time period (e.g., the time period corresponding approximately to the present replay of the broadcast). In a further example, the user may wish to view a mixture of relevant commentary from a past time period based on the preference for a past perspective and from a present time period based on the preference for a present perspective.

The time period employed to impart a temporal perspective to the relevant commentary may be based on any desired time scale. The time scale, for example, may include centuries, decades, years, months, weeks, days, seconds, and so on, or combinations thereof. The time period may be set according to any parameter. In one example, the time period may be employed according to a variance, such an approximate six-month variance from the date of creation of the media content. Thus, a time period may represent a preference for a past perspective spanning six months before and/or six months after the date of the creation of the media content. In another example, the time period may be employed according to a broadcast date of the media content. Thus, a time period may represent a preference for a past perspective for a past broadcast of the media content (e.g., comments made at the time of a past original broadcast), a preference for a past perspective before the broadcast of the media content (e.g., comments made before an original past and/or present broadcast), a preference for a present perspective for a present original broadcast of the media content (e.g., comments made during a present original broadcast), a preference for a present perspective for a present replay of a past original broadcast of the media content (e.g., comments made in the present related to a past original broadcast), and so on, or combinations thereof.

In addition, a portion of the relevant commentary RC1, RC2, RC3, RC4 may be provided based on a topic related to the media content. The user may view a present original broadcast of the media content (e.g., live video of a debate between the candidates 18, 20 occurring in real-time), a topic may be determined (e.g., topic related to the section of the media content rendered), and a portion of the relevant commentary (e.g., RC1, etc.) may be provided by, and/or received at, the commentary render portion 16 in accordance with the topic. The relevant commentary may be from a past time period, such as comments made at approximately the time of original broadcast in the past about a topic presented in that section of the video. The relevant commentary may be from a present time period, such as comments made at approximately the time of present replay about the topic.

The topic may be derived from a user statement, the media content, and so on, or combinations thereof. In one example, the user statement may include user commentary entered in response to commentary, to the section of the media content, and so on, or combinations thereof. For example, a section of the media content may be encountered (e.g., a discussion by the candidates 18, 20) to cause the user to enter user commentary (e.g., via voice, text, an opinion such as "thumbs up", favorite, bookmarking, etc.) representative of the topic. In another example, the topic may be derived from a statement made by a narrator of the media content, from an object in the media content (e.g., a statement made by the candidates 18, 20, etc.), from an author of the media content, from other information associated with the media content (e.g., metadata, section headings, titles, a quote, etc.), and so on, or combinations thereof.

In addition, the relevant commentary RC1, RC2, RC3, RC4 may be provided based on a preference for a viewpoint. For example, the user may view a present original broadcast of the media content (e.g., live video of a debate between the candidates 18, 20 occurring in real-time), a viewpoint may be determined (e.g., a viewpoint associated with a topic and/or a section of the media content), and a portion of the relevant commentary (e.g., RC1, etc.) may be provided by, and/or received at, the commentary render portion 16 in accordance with the viewpoint. The relevant commentary may be from a past time period, such as comments made at approximately the time of original broadcast in the past regarding a viewpoint presented in that section of the media content. The relevant commentary may be from a present time period, such as comments made at approximately the time of video replay regarding the viewpoint. The viewpoint may be derived from a user statement, user history information, and/or the media content. In one example, the user statement may include user commentary entered in response a section of the media content. For example, a section of the media content may be encountered (e.g., a topic raised by the candidates 18, 20) to cause the user to enter user commentary (e.g., via voice, text, a vote such as a "thumbs up", a favorite designation, bookmarking, etc.) representative of the viewpoint.

In another example, a section of the media content may be encountered to cause the viewpoint to be derived from the user history. The user history may include website search information, favorite information, bookmark information, metadata, opinion information (e.g., "thumbs up", rankings, etc.), social network membership information, comments made by the user in the past (e.g., posts, etc.), and so on, or combinations thereof. In a further example, a section of the media content may be encountered to cause the viewpoint to be derived from the media content. For example, the viewpoint may be derived from a statement made by a narrator of the media content, from an object in the media content (e.g., a statement made by the candidates 18, 20, etc.), from an author of the media content, from other information associated with the media content (e.g., metadata, section headings, titles, a quote, etc.), and so on, or combinations thereof.

The relevant commentary RC1, RC2, RC3, RC4 may also be provided based on one or more of a viewpoint agreement, a viewpoint disagreement, and/or viewpoint neutrality. The user may view a present original broadcast of the media content (e.g., live video of a debate between the candidates 18, 20 occurring in real-time), a viewpoint may be determined (e.g., one of the candidates 18, 20 talks about a specific topic of a certain point of view), and a portion of the relevant commentary (e.g., RC1, etc.) may be provided by, and/or received at, the commentary render portion 16 in accordance with the viewpoint correspondence. The relevant commentary provided may be based on a degree of correspondence with a viewpoint. In one example, the user may have a "pro" viewpoint for the topic, which may agree with the viewpoint of the speaker, and the relevant commentary may be provided corresponding to an agreement viewpoint of the user and the speaker (e.g., comments that agree with the viewpoint). In another example, the user may have a "pro" viewpoint for the topic, which disagrees with the viewpoint of the speaker, and the relevant commentary may be provided corresponding to a disagreement viewpoint (e.g., comments that disagree with the viewpoint of the user, comments that disagree with the viewpoint of the speaker, etc.). In a further example, the commentary may be based on a neutral position for the viewpoint, which may provide all comments related to the topic, no comments related to the topic, and so on, or combinations thereof.

The relevant commentary RC1, RC2, RC3, RC4 may also be provided based on one or more other viewpoint factors. For example, the commentary may be based on one or more of a geographic location, age, gender, height, weight, education, and/or career. In one example, the relevant commentary (e.g., RC1, etc.) which may be provided when the user is viewing the debate between the candidates 18, 20 may vary according to a geographic viewpoint (e.g., a Texas viewpoint, a New York viewpoint, etc.), according to an age viewpoint (e.g., relatively younger voters, relatively older voters, etc.), and so on, or combinations thereof.

In addition, the relevant commentary RC1, RC2, RC3, RC4 may be provided based on a preference for a state of a social network. The user may view a present original broadcast of the media content (e.g., live video of a debate between the candidates 18, 20 occurring in real-time), a state of a social network may be determined (e.g., membership of a social network, content accessible via the social network), and a portion of the relevant commentary (e.g., RC1, etc.) may be provided by, and/or received at, the commentary render portion 16 in accordance with the state of the social network. The relevant commentary may be from a past social network, such as by the members of the social network at approximately the time of original broadcast in the past, content accessible to the user via the social network at approximately the time of original broadcast in the past, and so on, or combinations thereof. The relevant commentary may be from a present social network, such as by the members of the social network at approximately the time of video replay, content accessible to the user via the social network at approximately the time of video replay, and so on, or combinations thereof.

Generally, a social network may include an online social network, such as intranet social network and/or internet social network, where users may interact and/or establish relationships with each other. For the purpose of illustration, a social intranet network may include a social community of employees able to communicate over an internal employer computer network. Internet social networks may include, for example, FACEBOOK®, TWITTER®, LINKEDIN® (registered trademarks of Facebook, Twitter, and Linkedin, respectively) web sites. In addition, internet social networks may include question-and-answer (Q&A) web sites, such as QUORA®, YAHOO!® ANSWERS, and STACK OVERFLOW® (registered trademarks of Quora, Yahoo, and Stack Overflow, respectively). Thus, a social network may include two or more people (e.g., a group) that communicate based on one or more criteria, such as shared interests, particular subjects, and so on, or combinations thereof. For the purpose of illustration, a social network may include two or more users that "like" a particular FACEBOOK® web page. In addition, any social network may include two or more people that express a relationship with each other, such as a professional, personal, familial, geographic, and/or educational relationship. Users of a social network may establish relationships with each other, such as by joining a group, becoming "friends", and/or establishing a "connection" to form a candidate social community. A social network may be pre-existing.

The relevant commentary may be scoped to the state of a social network to provide (and/or receive) relevant commentary that would be made, that was actually made, and so on, or combinations thereof. The relevant commentary may be scoped to a present state of the social network, which may include a state at approximately the time of a present replay of the media content, a state at approximately the time of a present original broadcast, and so on, or combinations thereof. The scope to the present state may include present commentary (e.g., present comments) and/or past commentary (e.g., past comments) representative of how members of that present social network would (and/or did) comment in response to the media content (and/or similar media content). In another example, the relevant commentary may be scoped to a past state of the social network, which may include a state at approximately the time before an original broadcast, a state at approximately the time of a past original broadcast, and so on, or combinations thereof. The scope to the past state may include present commentary (e.g., present comments) and/or past commentary (e.g., past comments) representative of how members of that past social network would (and/or did) comment in response to the media content (and/or similar media content). Thus, the members of a past social network and/or a present social network may appear to respond using a past sentiment and/or present sentiment.

In a further example, scoping the relevant commentary to the past social network state may cause the user to receive relevant commentary from users (e.g., members) in the social network (e.g., at a specific time in the past) and/or content that the user may have had access to via the social network (e.g., at the specific time in the past). In a yet another example, scoping the relevant commentary to the present social network state may cause the user to receive relevant commentary from users (e.g., members) in the social network (e.g., at a specific time in the present) and/or content that the user may have access to via the social network (e.g., at the specific time in the present). Thus, the state of one or more social networks may be utilized to determine which content is to be, and/or is not to be, provided to the user. In yet another example, specifying a state of a social network in the past (e.g., a state in the year 2012) may cause the content utilized (e.g., as potential relevant commentary) to include posts and/or content that the user may have had access to in the past (e.g., in the year 2012) via the social network in the past.

In addition, the relevant commentary RC1, RC2, RC3, RC4 may be provided based on an authorship independent of a media content access event by an author of the relevant commentary. The user may watch a present original broadcast of the media content (e.g., live video of a debate between the candidates 18, 20 occurring in real-time), it may be determined if an authorship independent of a media content access event occurred (e.g., commentary related to a topic of a section of the media content without viewing the media content), and a portion of the relevant commentary (e.g., RC1, etc.) may be provided by, and/or received at, the commentary render portion 16. The relevant commentary may be from a past time period, such as comments made at approximately the time of original broadcast in the past by authors that did not view the broadcast, comments made before the original broadcast, and so on, or combinations thereof. The relevant commentary may be from a present time period, such as comments made at approximately the time of video replay by authors that did not view the original broadcast, the replay, and so on, or combinations thereof.

Thus, while the relevant commentary may include commentary that was generated (e.g., authored) for the media content while the author viewed the media content, the relevant commentary may not necessarily be temporally and/or spatially linked to the media content. In one example, the relevant commentary does not come from the media content, was not generated specifically for the media content, was not generated while viewing the media content, and so on, or combinations thereof. In another example, the relevant commentary may be based on an authorship of the commentary that is related to a viewpoint, a topic, an object, and so on, or combinations thereof.

In the illustrated example of FIG. 1B, the scheme 8 includes components having similar reference numerals as those already discussed in the scheme 6 of FIG. 1A, and are to be understood to incorporate similar functionality. In this variation, the user may enter user commentary UC1 in the commentary render portion 16, at the time T1. The user commentary UC1 may be entered by making the commentary public, by typing in the commentary, by adding the commentary (e.g., copy and past a link, etc.), by making the commentary opaque, and so on, or combinations thereof. In one example, the user commentary UC1 may be entered in response to encountering a section of the media content (e.g., intermediate section of the video of the debate). In another example, the user commentary UC1 may be entered in response to encountering a topic and/or a viewpoint, for example a topic and/or a viewpoint presented by one or more of the candidates 18, 20. The user commentary may also be used to derive the viewpoint and/or or the topic. The user commentary UC1 may be from a present time period, such as a time period approximately at the time of replay of the media content. In addition, a portion of the relevant commentary RC1, RC2, RC3, RC4 may be based on the user commentary UC1, such as a post returned based on a topic and/or viewpoint represented by the user commentary UC1.

In the illustrated example, the user experience may be enhanced by simulating an interactive commentary session. In one example, the user commentary UC1 may be shared with a social network at the time T2, such as one or more present social networks affiliated with the user, to populate respective commentary render portions corresponding to one or more other affiliated members. In another example, the user commentary UC1 may be encountered to cause the commentary render portion 16 to populate with the relevant commentary RC1 at the time T2. The relevant commentary may be based on the user commentary UC1, as well as one or more of a preference for a temporal perspective, a viewpoint, a state of a social network, a topic, an authorship, and so on, or combinations thereof. The user may enter further user commentary UC2 and receive further relevant commentary RC2. Thus, an interactive commentary session may be simulated at the time T2.

Although the relevant commentary RC1, RC2 may be from a past time period, the commentary session may be perceived by the user as occurring in the present, in real-time, via the simulation. The user may view a recorded video of a debate which occurred in a past time period, may enter user commentary (e.g., UC1) that disagrees with one of the candidates 18, 20 (e.g., disagrees with a viewpoint) at the time T1, and receive relevant commentary (e.g., RC1, etc.) at the time T2 that an individual also disagreeing would have (and/or did) receive at time of original past broadcast of debate via the simulation. In addition, the relevant commentary (e.g., RC1, etc.) may include commentary from members of a past social network state and/or a present social network to provide past sentiments and/or present sentiments associated with the media content via the simulation. For example, members of a past social network may appear to respond via the simulation with relevant commentary representative of their present viewpoints, of their past viewpoints, etc., while members of a present social network may appear to respond via the simulation with relevant commentary representative of their present viewpoints, of their past viewpoints, etc., and so on, or combinations thereof. In the illustrated example of FIG. 1C, the scheme 10 includes components having similar reference numerals as those already discussed in the scheme 6 of FIG. 1A and/or scheme 8 of FIG. 1B, and are to be understood to incorporate similar functionality. In this variation, the user may view initial commentary IC1 in the commentary render portion 16, at the time T1. The initial commentary IC1 may be displayed by making the commentary public, by adding the commentary, by making the commentary opaque, and so on, or combinations thereof. In one example, the initial commentary IC1 may be displayed in response to encountering a section of the media content. In another example, the initial commentary IC1 may be displayed in response to encountering a topic and/or a viewpoint. The initial commentary IC1 may also be used to derive the viewpoint and/or or the topic. The initial commentary IC1 may be from a present time period, a past time period, and so on, or combinations thereof.

The initial commentary IC1 may be used to determine a user interest. The user interest may involve an interest for a viewpoint and/or topic represented by the initial commentary IC1. In the illustrated example, the user commentary UC1 may be entered in response to the initial commentary IC1 at the time T1, which may lead to an interaction (e.g., FIG. 1A, FIG. 1B, etc.), described above, at the time T2. For example, at least a portion of the relevant commentary may be provided based on the user commentary. The initial commentary IC1 may also be used to clarify an ambiguous section of the media content. The initial commentary IC1 may include one or more questions made at a render of the ambiguous section, a comment made (e.g., a comment about the subject matter of the content) at the render of the ambiguous section, a comment made (e.g., an answer) in response to a comment made (e.g., a question) at a render of the ambiguous section, and so on, or combinations thereof.

In the illustrated example, the user may view clarifying commentary CC1 in the commentary render portion 16, at the time T1. The clarifying commentary CC1 may be displayed by making the commentary public, by adding the commentary, by making the commentary opaque, and so on, or combinations thereof. In one example, the clarifying commentary CC1 may be displayed in response to encountering a section of the media content that is ambiguous, determined from questions made, from initial commentary IC1, from user commentary UC1, from mappings, from metadata, and so on, or combinations thereof. The clarifying commentary CC1 may be displayed in response to encountering a topic and/or a viewpoint, and/or may be used to derive the viewpoint and/or or the topic. The clarifying commentary CC1 may be a further refinement of the initial commentary IC1, or may be the initial commentary IC1 itself. The clarifying commentary CC1 may include a comment describing the media content, a link to further comments describing the media content, responses to questions made in the past related to the media content, and so on, or combinations thereof. Accordingly, the user commentary UC2 may be entered in response to the clarifying commentary CC1 at the time T1 (e.g., comment "that makes sense", a link having a relative high degree of relatedness to a possible topic, etc.), which may lead to an interaction (e.g., FIG. 1A, FIG. 1B, etc.), as described above, and/or the interaction of FIG. 1C at the time T2.

FIG. 2 shows an architecture 102 that may be used to provide (and/or receive) relevant commentary in response to rendering a section of media content according to an embodiment. In the illustrated example, media logic 122 may detect a media content access event. In one example, the media logic 122 may detect the generation, processing, storing, retrieving, rendering, and/or exchanging of information in electronic form. The media logic 122 may also identify a section of the media content, such as a frame of the media content, an intermediate section of the media content, and so on, or combinations thereof. In the illustrated example, user logic 128 may enter user commentary, which may be from a present time period, a past time period, and so on, or combinations thereof. In one example, the user commentary may be related to the media content, the section of the media content, a viewpoint, a topic, and so on, or combinations thereof.

The user logic 128 may provide a user interface (e.g., a graphical user interface, a command line interface, etc.) to access one or more configurable settings. In one example, the user logic 128 may provide access to one or more settings associated with providing and/or receiving relevant commentary. The settings may include options to determine the media access event, to identify a section of the media content, to specify the number and the type of relevant commentary, to specify the manner of displaying the media content and/or commentary, to specify the manner of entering user commentary, initial commentary, and/or clarifying commentary, to derive a viewpoint and/or a topic, to specify a preference for a temporal perspective, for a viewpoint, for a state of social network, to specify an authorship independent of a media content access event by an author of the relevant commentary, to clarify an ambiguous section of the media content, and/or to simulate an interactive commentary session. The settings may include an automatic feature, for example to automatically determine the configurations based on history information, machine learning processes, and so on, or combinations thereof. In one example, the time period may be set by the user via the user interface, which may allow the user to input the time period, select the time period, enable (and/or disable) an automatic implementation of a manually and/or automatically derived time period, and so on, or combinations thereof.

In the illustrated example, relevant commentary logic 134 may filter the commentary. The relevant commentary logic 134 may filter the commentary based on a preference for a temporal perspective, such as a past perspective, a present perspective, and so on, or combinations thereof. The relevant commentary logic 134 may determine and/or employ a time period to impart a temporal perspective to the relevant commentary, which may be on any desired time scale. The time period may be employed based on any parameter, such as a variance, a broadcast date, and so on, or combinations thereof. In addition, the relevant commentary logic 134 may filter the commentary based on a preference for a viewpoint, which may be derived from a user statement, user history information, the media content, and so on, or combinations thereof. In one example, the relevant commentary logic 134 may filter the commentary based a viewpoint agreement, a viewpoint disagreement, and/or a viewpoint neutrality. In another example, the relevant commentary logic 134 may filter the commentary based on one or more further viewpoint factors, such as a geographic location, age, gender, and so on, or combinations thereof.

The relevant commentary logic 134 may also filter the commentary based on a preference for a state of a social network, such as a past state of a social network, a present state of a social network, and so on, or combinations thereof. The relevant commentary logic 134 may determine the state of the social network, and/or filter the commentary based on the state, to provide present commentary and/or past commentary representative of how members of the past social network and/or the present social network would (and/or did) comment in response to the media content (and/or similar media content), to provide content accessible via the social network according to the state, and so on, or combinations thereof. In addition, the relevant commentary logic 134 may determine a topic related to the media content. The relevant commentary logic 134 may derive the topic from a user statement, the media content, and so on, or combinations thereof. In one example, the topic may be related to a section of the media content (e.g., a chapter, etc.). The relevant commentary logic 134 may also derive the topic from a comment expressed by one or more of the user and/or the media content.

The relevant commentary logic 134 may determine an authorship of the media content. An author of the media content may include a performer of the media content (e.g., writer, singer, etc.), an organization that is the source of the media content (e.g., publisher, source web site, etc.), and so on, or combinations thereof. In one example, the relevant commentary logic 134 may determine if an authorship of the relevant commentary is independent of a media content access event by the author of the relevant commentary. The relevant commentary logic 134 may provide commentary that was made for the media content, that does not come from the media content, was not generated specifically for the media content, was not generated while viewing the media content, and so on, or combinations thereof.

The relevant commentary logic 134 may also enter initial commentary, for example in response to encountering a section of the media content, in response to encountering a topic and/or a viewpoint, and so on, or combinations thereof. The relevant commentary logic 134 may enter initial commentary that may be from a present time period (e.g., as real-time initial commentary), from a past time period (e.g., as stored initial commentary), and so on, or combinations thereof. In one example, the initial commentary may be related to the media content, the section of the media content, a viewpoint, a topic, and so on, or combinations thereof. The relevant commentary logic 134 may enter the initial commentary to determine a user interest, to clarify an ambiguous section of the media content, to derive a topic and/or a viewpoint, and so on, or combinations thereof.

The relevant commentary logic 134 may clarify an ambiguous section of the media content. The relevant commentary logic 134 may clarify the section by, for example, determining and/or employing information such as a mapping associated with the ambiguous section, metadata associated with the media content, and so on, or combinations thereof. The relevant commentary logic 134 may enter clarifying commentary in response to, for example, encountering a section of the media content that is ambiguous, encountering a topic and/or a viewpoint, and so on, or combinations thereof. The relevant commentary logic 134 may enter clarifying commentary that may be from a present time period (e.g., as real-time initial commentary), from a past time period (e.g., as stored initial commentary), and so on, or combinations thereof. In one example, the relevant commentary may be related to the media content, the section of the media content, a viewpoint, a topic, and so on, or combinations thereof. In another example, the clarifying commentary may be a further refinement of the initial commentary, may be the initial commentary itself, and so on, or combinations thereof. The relevant commentary logic 134 may enter clarifying commentary to derive a viewpoint and/or or a topic. In addition, the relevant commentary logic 134 may also simulate an interactive commentary session. The interactive commentary session may provide a user experience where the commentary session may be perceived by the user as occurring in the present (in real-time), even though the relevant commentary may be from a past time period, a present time period, and so on, or combinations thereof.

Accordingly, the relevant commentary logic 134 may provide relevant comment data 152 having relevant commentary based on one or more of the logic associated therewith. In one example, a user may view a broadcast of a debate that occurred in the past, and the user may receive a stream of posts that were made in real-time during the debate in the past. In addition, the user may make a post (e.g., user commentary) related to the content of the broadcast (e.g., a topic) and/or related to the stream of posts (e.g., negative posts, positive posts, general questions, etc.). The user may, in response, receive posts and/or other content (e.g., news articles, blog posts, video responses, etc.) from the past that were responses to similar posts as the user post. The user may also specify a setting to filter the commentary to view comments that coincide (e.g., agree, disagree, are natural) with the broadcast, the stream of posts, and/or the user post. The user may scope the commentary to past viewpoints of members of a past social network, present viewpoints of members of a present social network, present viewpoints of members of a past social network, and so on, or combinations thereof. Thus, if the user agrees with a candidate's position for a topic presented in the debate and has a preference for an experience of opposition at the time of the original broadcast of the debate in the past, the user will be provided a stream of posts (e.g., poll disapproval ratings, twitter posts, etc.) reflecting the opposition during the time of the debate in the past.

In another example, a user may view a broadcast of a debate that occurred in the past, and the user may receive a stream of posts that are presently being made in real-time at the time of the replay of the debate in the present. The stream of posts may be related to a viewpoint and/or a topic. The user may make a post (i.e., to the architecture 102 and/or the broader social network) related to the content of the broadcast (e.g., a topic), the stream of posts (e.g., negative posts, positive posts, general questions, etc.), and so on, or combinations thereof. The user may, in response, receive posts and/or other content (e.g., news articles, blog posts, video responses, etc.) from the present that are related to the content and/or the user post. The user may also specify a setting to filter the commentary to view comments that coincide (e.g., agree, disagree, are neutral) with the broadcast, the stream of posts, and/or the user post. The user may scope the commentary to past viewpoints of members of a past social network, present viewpoints of members of a present social network, present viewpoints of members of a past social network, and so on, or combinations thereof. Thus, if the user agrees with a candidate's position for a topic presented in the debate and has a preference for an experience of support at the time of replay of the debate in the present, the user will be provided a stream of posts (e.g., poll approval ratings, twitter posts, etc.) reflecting the support that are presently being made at the time of replay of the debate in the present.

In a further example, a user may view a broadcast of a debate that occurred in the past, and a portion of the content may be analyzed for an ambiguous section of the broadcast based on, for example, questions that were made during the broadcast, after the broadcast, and so on, or combinations thereof. Thus, when an identified ambiguous section of the broadcast is replayed, the user may view posts made for clarification to provide a greater level of understanding to the user (e.g., an understanding of the media content, of a topic, of a viewpoint, etc.). The architecture 102 may determine the context of the section of the broadcast by analyzing metadata associated with the content, a posting generated approximately at the time of each section of the broadcast, and so on, or combinations thereof. The architecture 102 may also leverage sources for mappings between the media content sections and relevant posts (and/or media content). Mapping information may include tags, time stamp relationships, and prior interaction history with the source (and/or source author) of the media content being viewed, of similar content, and so on, or combinations thereof.

In yet another example, the user may receive commentary made (e.g., presently made, made in the past, etc.) associated with one or more topics presented in the media content (e.g., debate) without requiring the author of the commentary to view the media content. The commentary may be obtained from, for example, a present article from a news organization associated with one or more topics presented in the media content, a post made in response to reading the present news article, and so on, or combinations thereof. In yet a further example, the architecture 102 may determine a viewpoint of the user, the media content, and so on, or combinations thereof. Thus, the architecture 102 may filter the commentary based on a temporal preference, a viewpoint, and/or a state of the social network to provide data from the past, the present, or a combination thereof. The user may have the opportunity to post an opinion, and view commentary from any desired time period, from any desired viewpoint, and/or from any desired social network. In addition, the user may experience an interactive commentary session which may appear as a live commentary interaction session, although the commentary is not being generated (e.g., authored) in real-time.

Figure 3:
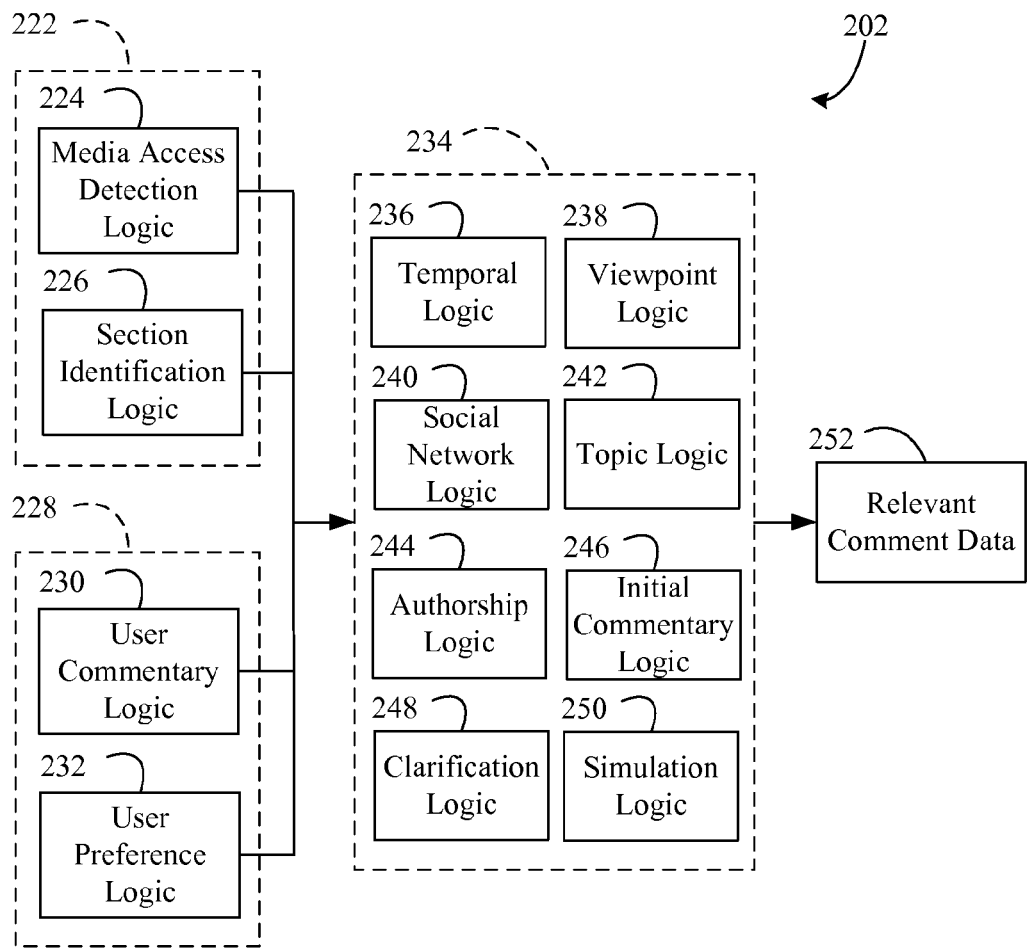
FIG. 3 is a block diagram of an example of an architecture including a variation in logic to provide (and/or receive) relevant commentary in response to a render of a section of media content according to an embodiment.

Turning now to FIG. 3, an architecture 202 is shown that may be used to provide (and/or receive) relevant commentary in response to rendering a section of media content according to an embodiment. Logic components identified in the architecture 202 of FIG. 3 having similar reference numerals as those already discussed in the architecture 102 of FIG. 2 are to be understood to incorporate similar functionality. In this variation, media logic 222 may include media access detection logic 224 to detect a media content access event. The media access detection logic 224 may detect the generation, processing, storing, retrieving, rendering, and/or exchanging of information in electronic form. In one example, the media access detection logic 224 may detect launching of a media player application, launching of a web browser, retrieving of the media content from storage, receiving the media content from an image capture device (e.g., on or off-device camera), rendering (e.g., displaying) the media content, and so on, or combinations thereof. In addition, the media logic 222 may include section identification logic 226 to identify a section of the media content. The section identification logic 226 may identify a frame of a video, an area of an image, a segment of audio, a domain of a hypertext link, a chapter of a book, a paragraph of an article, and so on, or combinations thereof. The section identification logic 226 may also identify a beginning section of the media content, an intermediate section of the media content, a final section of the media content, and so on, or combinations thereof.

In the illustrated example, user logic 228 may include user commentary logic 230 to enter user commentary. The user commentary logic 230 may enter user commentary by making the commentary public, by typing in the commentary, by adding the commentary (e.g., copy and past a link, etc.), by making the commentary opaque, and so on, or combinations thereof. The user commentary may be from a present time period, for example as real-time user commentary. The user commentary may be from a past time period, for example as stored user commentary. The user commentary may be related to the media content, the section of the media content, a viewpoint, a topic, and so on, or combinations thereof. The user logic 228 may also include user preference logic 232. The user preference logic 232 may provide access to one or more settings associated with providing and/or receiving relevant commentary.

In the illustrated example, relevant commentary logic 234 may include temporal logic 234 to filter the commentary based on a preference for a temporal perspective. The temporal logic 234 may filter the commentary based on a preference for a past perspective, a preference for a present perspective, and so on, or combinations thereof. The temporal logic 234 may determine and/or employ a time period to impart a temporal perspective to the relevant commentary, which may be on any desired time scale. The time period may be employed based on any parameter, such as a variance, a broadcast date, and so on, or combinations thereof.

In the illustrated example, the relevant commentary logic 234 may include viewpoint logic 238 to filter the commentary based on a preference for a viewpoint. In one example, the viewpoint logic 238 may derive the viewpoint from one or more of a user statement, user history information, the media content (e.g., a section of the media content), and so on, or combinations thereof. In another example, the viewpoint logic 238 may filter the commentary based on one or more of a viewpoint agreement, a viewpoint disagreement, a viewpoint neutrality, and so on, or combinations thereof. In a further example, the viewpoint logic 238 may derive the commentary based on one or more further viewpoint factors, such as a geographic location, age, gender, and so on, or combinations thereof.

In the illustrated example, the relevant commentary logic 234 may include social network logic 240 to filter the commentary based on a preference for a state of a social network. The social network logic 240 may filter the commentary based on a preference for a past state of a social network, a present state of a social network, and so on, or combinations thereof. The social network logic 240 may determine the state of the social network, and/or filter the commentary based on the state, to provide present commentary and/or past commentary representative of how members of the past social network and/or the present social network would (and/or did) comment in response to the media content (and/or similar media content), to provide content accessible via the social network according to the state, and so on, or combinations thereof.

In the illustrated example, the relevant commentary logic 234 may include topic logic 242 to determine a topic related to the media content. The topic logic 242 may derive the topic from a user statement, the media content, and so on, or combinations thereof. In one example, the topic may be related to a section of the media content (e.g., portion thereof, a chapter, etc.). The topic logic 242 may derive the topic from a comment expressed by one or more of the user, the media content, and so on, or combinations thereof.

In the illustrated example, the relevant commentary logic 234 may include authorship logic 244 to determine an authorship of the media content. The authorship logic 244 may determine if an authorship of the commentary is independent of a media content access event by the author of the relevant commentary. In one example, the authorship logic 244 may filter the commentary to provide commentary that was made for the media content, that does not come from the media content, was not generated specifically for the media content, was not generated while viewing the media content, and so on, or combinations thereof.

In the illustrated example, the relevant commentary logic 234 may include initial commentary logic 246 to provide initial commentary. The initial commentary logic 246 may enter the initial commentary by making the commentary public, by typing in the commentary, by adding the commentary (e.g., copy and past a link, etc.), by making the commentary opaque, and so on, or combinations thereof. The initial commentary may be from a present time period, for example as real-time initial commentary. The initial commentary may be from a past time period, for example as stored initial commentary. The initial commentary may be related to the media content, the section of the media content, a viewpoint, a topic, and so on, or combinations thereof. The initial commentary logic 246 may enter the initial commentary to determine a user interest, to clarify an ambiguous section of the media content, to derive a topic and/or a viewpoint, and so on, or combinations thereof.

In the illustrated example, the relevant commentary logic 234 may include clarification logic 248 to clarify an ambiguous section of the media content. The clarification logic 248 may determine and/or employ information to clarify the ambiguous section, such as a mapping associated with the ambiguous section, metadata associated with the media content, and so on, or combinations thereof. The clarification logic 248 may enter clarifying commentary by making the commentary public, by adding the commentary, my making the commentary opaque, and so on, or combinations thereof. The clarification logic 248 may enter clarifying commentary in response to, for example, encountering a section of the media content that is ambiguous, encountering a topic and/or a viewpoint, and so on, or combinations thereof. The clarification logic 248 may enter clarifying commentary that may be from a present time period (e.g., as real-time initial commentary), from a past time period (e.g., as stored initial commentary), and so on, or combinations thereof. The relevant commentary may be related to the media content, the section of the media content, a viewpoint, a topic, and so on, or combinations thereof. The clarifying commentary may be a further refinement of the initial commentary, may be the initial commentary itself, and so on, or combinations thereof. The clarification logic 248 may enter clarifying commentary to derive a viewpoint and/or or a topic.

In the illustrated example, the relevant commentary logic 234 may include simulation logic 250 to simulate an interactive commentary session. The simulation logic 250 may provide a user experience where the commentary session may appear as occurring in the present, in real-time, even though the relevant commentary may be from a past time period, a present time period, and so on, or combinations thereof. Accordingly, the relevant commentary logic 234 may provide relevant comment data 252 having relevant commentary based on one or more of the logic associated therewith.

Figure 4:
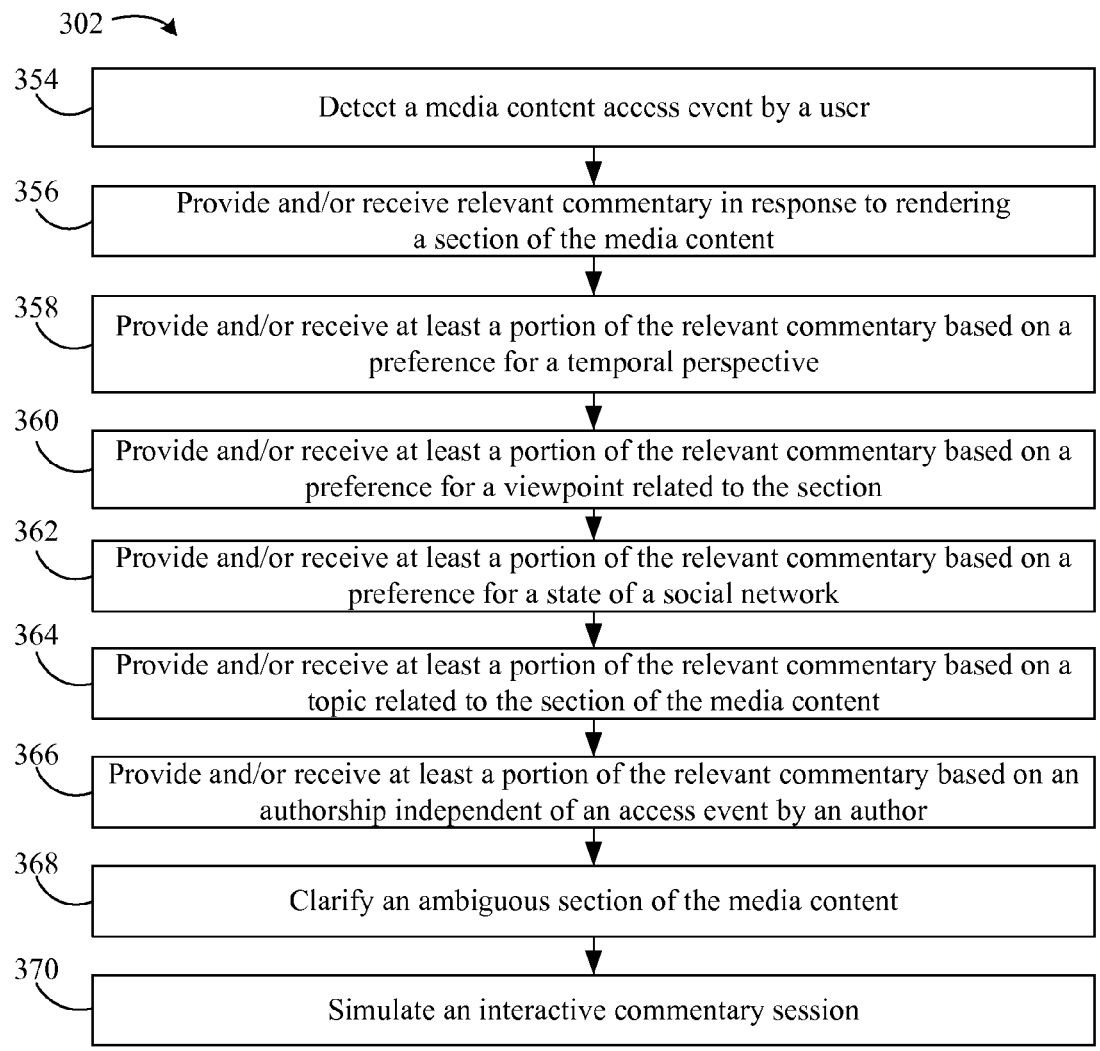
FIG. 4 is a flowchart of an example of a method of providing (and/or receiving) relevant commentary in response to rendering a section of media content according to an embodiment.

FIG. 4 shows a method 302 of providing and/or receiving relevant commentary in response to rendering a section of media content according to an embodiment. Illustrated processing block 354 provides for detecting a media content access event, for example by a user, by a computing platform, and so on, or combinations thereof. Thus, the media content access event may correspond to, for example, the media content access event (e.g., FIG. 1 to FIG. 3) already discussed. Relevant commentary may be provided and/or received in response to rendering the media content, such as a section of the media content, at block 356. The relevant commentary may correspond to, for example, the relevant commentary (e.g., FIG. 1 to FIG. 3) already discussed. At least a portion of the relevant commentary may be provided and/or received based on a preference for a temporal perspective at block 358, wherein the temporal perspective in block 358 may correspond to, for example, the temporal perspective (e.g., FIG. 1 to FIG. 3) already discussed. At least a portion of the relevant commentary may be provided and/or received based on a preference for a viewpoint at block 360, wherein the viewpoint in block 360 may correspond to, for example, the viewpoint (e.g., FIG. 1 to FIG. 3) already discussed. At least a portion of the relevant commentary may be provided and/or received based on a preference for a state of a social network at block 362, wherein the state of the social network in block 362 may correspond to, for example, the state (e.g., FIG. 1 to FIG. 3) already discussed.

The method 302 may also provide and/or receive at least a portion of the relevant commentary based on a topic at block 364, for example a topic related to the section of the media content that is rendered. Thus, the relevant commentary in block 364 may correspond to, for example, the relevant commentary based on a topic (e.g., FIG. 1 to FIG. 3) already discussed. In addition, the method 302 may provide and/or receive at least a portion of the relevant commentary based on an authorship independent of a media content access event by an author of the relevant commentary at block 366. Thus, the relevant commentary in block 366 may correspond to, for example, the relevant commentary based on an authorship (e.g., FIG. 1 to FIG. 3) already discussed. Additionally, the method 302 may clarify an ambiguous section of the media content at block 368. Thus, for example, an ambiguous section of the media content at block 368 may be clarified (e.g., FIG. 1 to FIG. 3) as already discussed. The method 302 may also simulate an interactive commentary session at block 370. Thus, for example, an interactive commentary session at block 370 may be simulated (e.g., FIG. 1 to FIG. 3) as already discussed.

While not shown, it is understood that any functionality presented herein may be employed in the operation of the method 302. For example, the method 302 may provide and/or receive initial commentary to the user related to the section, provide and/or receive user commentary in response to the initial commentary, provide and/or receive at least a portion of the relevant commentary based the user commentary, and so on, or combinations thereof. In addition, the method 302 may provide and/or receive media content and initial commentary from a past time period, user commentary from a present time period, and/or a portion of the relevant commentary from the past time period. The method 302 may also provide and/or receive media content from a past time period, initial commentary and user commentary from a present time period, and a portion of the relevant commentary from the present time period. As a final non-limiting example, the method 302 may provide and/or receive a portion of the relevant commentary from a present time period and a past time period.

Figure 5:
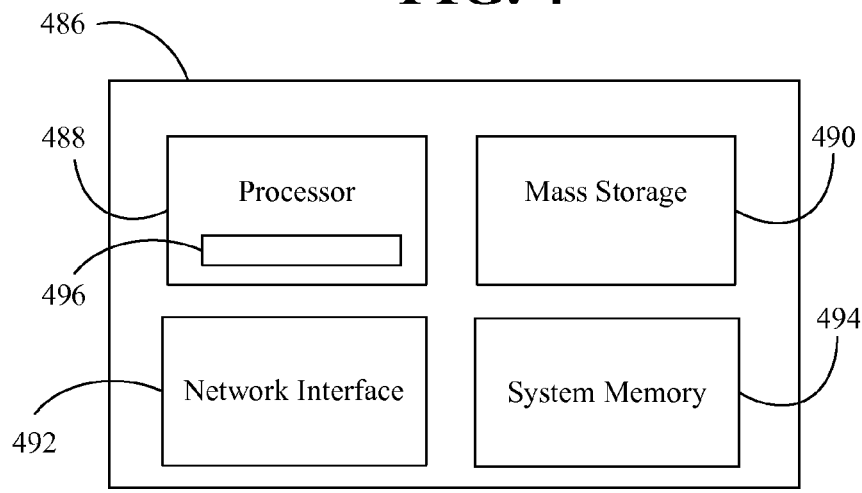
FIG. 5 is a block diagram of an example of a computing device according to an embodiment.

FIG. 5 shows a computing device 486 having a processor 488, mass storage 490 (e.g., read only memory/ROM, optical disk, flash memory), a network interface 492, and system memory 494 (e.g., random access memory/RAM). In the illustrated example, the processor 488 is configured to execute logic 496, wherein the logic 496 may implement one or more aspects of the schemes 8 to 10 (FIG. 1A to FIG. 1C), the architecture 102 (FIG. 2), the architecture 202 (FIG. 3), and/or the method 302 (FIG. 4), already discussed. Thus, the logic 496 may enable the computing device 486 to function to provide (and/or receive) relevant commentary, for example in response to rendering a section of media content. The logic 496 may also be implemented as a software application that is distributed among many computers (e.g., local or remote). Thus, while a single computer could provide the functionality described herein, systems implementing these features can use many interconnected computers (e.g., for scalability as well as modular implementation).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product comprising:
    a computer readable storage medium; and
    computer usable code stored on the computer readable storage medium, where, when executed by a microprocessor, the computer usable code causes a computer to:
        provide media content to a user;
        identify commentary generated within a variance period from a date of creation of the media content and one or more of a preference for a viewpoint and a preference for a state of a social network;
        provide said commentary to the user; and
        clarify an ambiguous section of the media content using the commentary.

2. The computer program product of claim 1, wherein the computer usable code, if executed, further causes a computer to:
    provide initial commentary to the user to be related to the section;
    receive user commentary to be in response to the initial commentary; and
    provide at least a portion of the relevant commentary to be based on the user commentary.

3. The computer program product of claim 1, wherein the computer usable code, if executed, further causes a computer to perform one or more of the following:
    provide at least a portion of the relevant commentary to be based on a topic to be related to the section of the media content;
    provide at least a portion of the relevant commentary to be based on an authorship independent of a media content access event by an author of the relevant commentary; and
    simulate an interactive commentary session.

4. A computer program product comprising:
    a computer readable storage medium; and
    computer usable code stored on the computer readable storage medium, where, when executed by a microprocessor, the computer usable code causes a computer to:
        receive relevant commentary in response to a render of a section of video media content, wherein at least a portion of the relevant commentary is generated within a variance period from a date of creation of the media content; and
        clarify an ambiguous section of the media content using the relevant commentary.

5. The computer program product of claim 4, wherein the computer usable code, if executed, further causes a computer to:
    receive initial commentary to be related to the section;
    provide user commentary to be in response to the initial commentary; and
    receive at least a portion of the relevant commentary to be based on the user commentary.

6. The computer program product of claim 4, wherein the computer usable code, if executed, further causes a computer to perform one or more of the following:
    receive at least a portion of the relevant commentary to be based on a preference for a viewpoint to be related to the section of the media content;
    receive at least a portion of the relevant commentary to be based on a preference for a state of a social network;
    receive at least a portion of the relevant commentary to be based on a topic to be related to the section of the media content;

receive at least a portion of the relevant commentary to be based on an authorship independent of a media content access event by an author of the relevant commentary;

simulate an interactive commentary session.

7. A computer program product comprising:

a computer readable storage medium; and computer usable code stored on the computer readable storage medium, where, when executed by a microprocessor, the computer usable code causes a computer to:

provide media content to a user;

identify commentary generated within a variance period from a date of creation of the media content and one or more of a preference for a viewpoint and a preference for a state of a social network;

provide said commentary to the user; and clarify an ambiguous section of the media content using the commentary.

8. The computer program product of claim 7, wherein the computer usable code, if executed, further causes a computer to:

provide initial commentary to the user to be related to the section;

receive user commentary to be in response to the initial commentary; and provide at least a portion of the relevant commentary to be based the user commentary.

9. The computer program product of claim 8, wherein the computer usable code, if executed, further causes a computer to cause the media content and the initial commentary to be from a past time period, the user commentary to be from a present time period, and the portion of the relevant commentary to be from the past time period to be based on the preference for a past perspective.

10. The computer program product of claim 8, wherein the computer usable code, if executed, further causes a computer to cause the media content to be from a past time period, the initial commentary and the user commentary to be from a present time period, and the portion of the relevant commentary to be from the present time period to be based on the preference for a present perspective.

11. The computer program product of claim 8, wherein the computer usable code, if executed, further causes a computer to cause the portion of the relevant commentary to be from a present time period and a past time period to be based on the preference for a present perspective and a past perspective.

12. The computer program product of claim 7, wherein the computer usable code, if executed, further causes a computer to provide at least a portion of the relevant commentary to be based on a preference for a viewpoint to be related to the section.

13. The computer program product of claim 12, wherein the computer usable code, if executed, further causes a computer to derive the viewpoint from one or more of a user statement, user history information, and the section of the media content.

14. The computer program product of claim 12, wherein the computer usable code, if executed, further causes a computer to provide the relevant commentary to be based on one or more of a viewpoint agreement, a viewpoint disagreement, and a viewpoint neutrality.

15. The computer program product of claim 7, wherein the computer usable code, if executed, further causes a computer to provide at least a portion of the relevant commentary to be based on a preference for a state of a social network.

16. The computer program product of claim 7, wherein the computer usable code, if executed, further causes a computer to provide at least a portion of the relevant commentary to be based on a topic to be related to the section of the media content.

17. The computer program product of claim 16, wherein the computer usable code, if executed, further causes a computer to derive the topic from a comment expressed by one or more of the user and the media content.

18. The computer program product of claim 7, wherein the computer usable code, if executed, further causes a computer to provide at least a portion of the relevant commentary to be based on an authorship independent of a media content access event by an author of the relevant commentary.

19. The computer program product of claim 7, wherein the computer usable code, if executed, further causes a computer to simulate an interactive commentary session.

* * * * *